March 28, 1967 C. M. MELAS 3,311,878

ERROR CHECKING SYSTEM FOR BINARY PARALLEL COMMUNICATIONS

Filed Feb. 14, 1963 6 Sheets-Sheet 1

INVENTOR.
CONSTANTIN M. MELAS
BY
Arthur Decker
ATTORNEY

March 28, 1967 C. M. MELAS 3,311,878

ERROR CHECKING SYSTEM FOR BINARY PARALLEL COMMUNICATIONS

Filed Feb. 14, 1963 6 Sheets-Sheet 2

F-F F1 LOGIC ($D_{1-8}$)

($F1 = I1 \oplus F2 \oplus F4$)

| INPUTS I1 | F2 | F4 | RESULT F1 |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

$${}_1f_1 = \left[I_1(F_2F_4 + F_2'F_4') + I_1'(F_2F_4' + F_2'F_4)\right] D_{1-8}$$

$${}_0f_1 = \left[I_1(F_2F_4' + F_2'F_4) + I_1'(F_2F_4 + F_2'F_4')\right] D_{1-8}$$

FIG. 3

F-F F2 LOGIC ($D_{1-8}$)

($F2 = I2 \oplus F3 \oplus F5$)

| INPUT I2 | F3 | F5 | RESULT F2 |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

$${}_1f_2 = \left[I_2(F_3F_5 + F_3'F_5') + I_2'(F_3F_5' + F_3'F_5)\right] D_{1-8}$$

$${}_0f_2 = \left[I_2(F_3F_5' + F_3'F_5) + I_2'(F_3F_5 + F_3'F_5')\right] D_{1-8}$$

FIG. 4

F-F F3 LOGIC ($D_{1-8}$)

($F3 = I3 \oplus F1 \oplus F2 \oplus F6$)

| INPUTS I3 | F1 | F2 | F6 | RESULT F3 |
|---|---|---|---|---|
| 0 | 0 | 0 | 0 | 0 |
| 0 | 0 | 0 | 1 | 1 |
| 0 | 0 | 1 | 0 | 1 |
| 0 | 0 | 1 | 1 | 0 |
| 0 | 1 | 0 | 0 | 1 |
| 0 | 1 | 0 | 1 | 0 |
| 0 | 1 | 1 | 0 | 0 |
| 0 | 1 | 1 | 1 | 1 |
| 1 | 0 | 0 | 0 | 1 |
| 1 | 0 | 0 | 1 | 0 |
| 1 | 0 | 1 | 0 | 0 |
| 1 | 0 | 1 | 1 | 1 |
| 1 | 1 | 0 | 0 | 0 |
| 1 | 1 | 0 | 1 | 1 |
| 1 | 1 | 1 | 0 | 1 |
| 1 | 1 | 1 | 1 | 0 |

$${}_1f_3 = \left\{I_3\left[F_1(F_2F_6' + F_2'F_6) + F_1'(F_2F_6 + F_2'F_6')\right] + I_3'\left[F_1(F_2F_6 + F_2'F_6') + F_1'(F_2F_6' + F_2'F_6)\right]\right\} D_{1-8}$$

$${}_0f_3 = \left\{I_3\left[F_1(F_2F_6 + F_2'F_6') + F_1'(F_2F_6' + F_2'F_6)\right] + I_3'\left[F_1(F_2F_6' + F_2'F_6) + F_1'(F_2F_6 + F_2'F_6')\right]\right\} D_{1-8}$$

FIG. 5

March 28, 1967 C. M. MELAS 3,311,878

ERROR CHECKING SYSTEM FOR BINARY PARALLEL COMMUNICATIONS

Filed Feb. 14, 1963 6 Sheets-Sheet 6

United States Patent Office 3,311,878
Patented Mar. 28, 1967

3,311,878

ERROR CHECKING SYSTEM FOR BINARY PARALLEL COMMUNICATIONS

Constantin Michael Melas, Antibes, France, assignor to International Business Machines Corporation, New York, N.Y., a corporation of New York Filed Feb. 14, 1963, Ser. No. 258,385
3 Claims. (Cl. 340—146.1)

This invention relates to systems for detection, location and correction of errors in binary coded information conveyed between remote communications stations, and, more particularly, to such systems as applied to information conveyances by means of a plurality of simultaneously operating communications links.

There are presently available a number of well-documented techniques devoted to detection, location and correction of errors in binary coded information which is transmitted serially a bit at a time between remote stations. Such transmission is often over an imperfect communications network: radio telegraphy is subject to atmospheric disturbances, telephony is subject to cross-talk and line noise, gating networks within a data processing computer are subject to spurious oscillations, a computer system involving cooperation between peripheral equipments is subject to intermittent loss of synchronization, etc. Such error handling techniques may be as limited as an odd-even parity check, capable only of detecting an odd or even number of errors, or as potent as burst checking systems capable of correcting a plurality of combinational types of error. In order to provide a background which will serve to distinguish the contribution of the present invention, some of these systems will be briefiy reviewed.

The parity check adds, usually, a check bit to the information bits and all bits are transmitted as a train of signals, each signal representing one bit. For example, for an even parity check, the value of the check bit is chosen so that each transmitted data group comprises an even number of binary one bits (i.e., the modulo 2 sum of the data group is computed). On reception of the data group, the presence of an odd sum indicates that an odd number of errors has occurred. This system cannot detect an even number of errors, it cannot indicate the location of errors within the data group and it cannot correct them without calling for the retransmission of the data group.

An advantage of prime significance beyond the above is described in Hamming et al., U.S. Re. 23,601. The of this patent locates and corrects a single transmission error (SE) in a data group by generating ("encoding") and transmitting a plurality of "locator" parity bits which are a function of the bits in selected bit positions of the data group. The selection sequence, for data groups in which locator parity bits follow information bits in transmission, resembles a binary counting sequence and the function is, as with the parity check, the modulo 2 sum. In operation, if a parity check ("decoding") produces a count of 0 for each selection of bits, no error was made, but if the result is otherwise, a combined count comprising all selection counts will indicate the bit position of the data group occupied by the bit in error. The patent also teaches the detection of a double error (DE) by adding another "error-type" parity bit which checks all bit positions of the data group.

Both SE correction and DE detection are also characteristic of systems conceived by Abramson and described in Patents Numbers 3,114,130 and 3,163,848. Abramson has realized that this result could also be achieved by selection of bit positions in accordance with a shift sequence and that a considerable practical advantage thereof is that mechanization of the parity checks may be by a shift register. Abramson further has realized that, in order to avoid ambiguity in error location, the shift sequence should be of maximum length, i.e., an "*m* sequence," which may be generated by a shift register having an "exclusive OR" feedback connection from one or more of the stages. Since more than one *m* sequence may be generated by registers having at least three stages and this type of feedback connection, Abramson points out that it is immaterial which sequence is employed provided that both the encoder at the transmitting station and the decoder at the receiving station use the same one. Abramson goes still further and shows double adjacent error (DAE) correction as well as SE correction, by utilizing both an *m* sequence and its inverse (*m'* sequence), one in the encoder and the other in the decoder.

In a Patent Number 3,213,426, Melas extends this approach to correcting errors in other combinations of bits in data groups and demonstrates by applying his system to double non-adjacent errors (DA'E) and triple adjacent errors (TAE). This is done by adding an additional locator parity bit and an additional error-type parity bit. Both the locator and error-type bits are chosen by *m* sequence selections of bit positions of the data group and thus two *m* sequence generators are required.

It is, of course, known that many other codes may be derived to accomplish the objects of error detection, location and correction. The basis for the high regard attached to maximum length shift sequence is the simplicity of the circuitry with which they may be coded and decoded, namely, with shift registers incorporating one or more modulo 2 or complemented modulo 2 feedback connections, i.e., exclusive "OR" connections.

However, none of the art examined by applicant has attacked the problem of transmission fidelity through error correction, in a system involving parallel-by-bit, serial-by-character transmission of digital information. Such systems are widely found in magnetic tape, punched cards, buffer equipment used for communication with high speed computers, in parallel computers themselves, etc., for which one of the intents of design is to speed operation by providing a plurality of communications paths operating on a plurality of information simultaneously. Thus, a magnetic tape unit capable of, for instance, 3-channel storage, may have a sensing multiple head which generates 3 bits simultaneously (which together may represent a character), one on each of 3 lines communicating with a computer arithmetic unit; a plurality of characters are generated sequentially and may further be divided into sequences of words, each, usually, comprising the same number of characters.

The system of the present invention is capable of detecting that, in a word, one or more bits of a character are affected by error, of locating the character in error and of correcting the character by generating its correct counterpart and substituting the latter for the former. The invention contemplates the transmission of complete words, comprising, in the embodiment selected for particular description, for instance, 3-bit characters, of which seven characters represent information and two characters are devoted to error checking. However, it is to be understood that the present system is easily adaptable to characters of any plurality of bit content and words of any character length, provided that the word length does not exceed the number of distinct character combinations which may be used in the word. The system requires only that an additional two characters be generated for purposes of error checking; these characters are preferably transmitted as the last two characters of the word. Thus, a 9-character word of 3-bit characters will comprise 7 sequential information characters followed by two check characters, and each character may consist of one of the 8 possible combinations of 3 bits.

It should therefore be apparent that it is an object of this invention to provide a system for the detection, location and correction of errors of various types commonly affecting binary coded information conveyed between remote communications stations by means of a plurality of simultaneously operating transmission links.

It is a further object of this invention to accomplish the above automatically such that operating personnel of the communications network need not be concerned with attending to this function.

It is a still further object of the invention to accomplish the foregoing with circuitry which is simple, inexpensive and reliable over extended periods of operation.

Another object of the invention is error detection, location and correction in binary coded information arranged in any of the character or word formats common in modern computer technology.

The foregoing and other objects, features and advantages of the invention will be apparent from the following more particular description of a preferred embodiment of the invention, as illustrated in the accompanying drawings.

FIGURES 3, 4 and 5 are tables from which the Boolean equations governing encoder operation may be derived, the equations representing triggering of a flip-flop being given below its table;

Figure 7A:
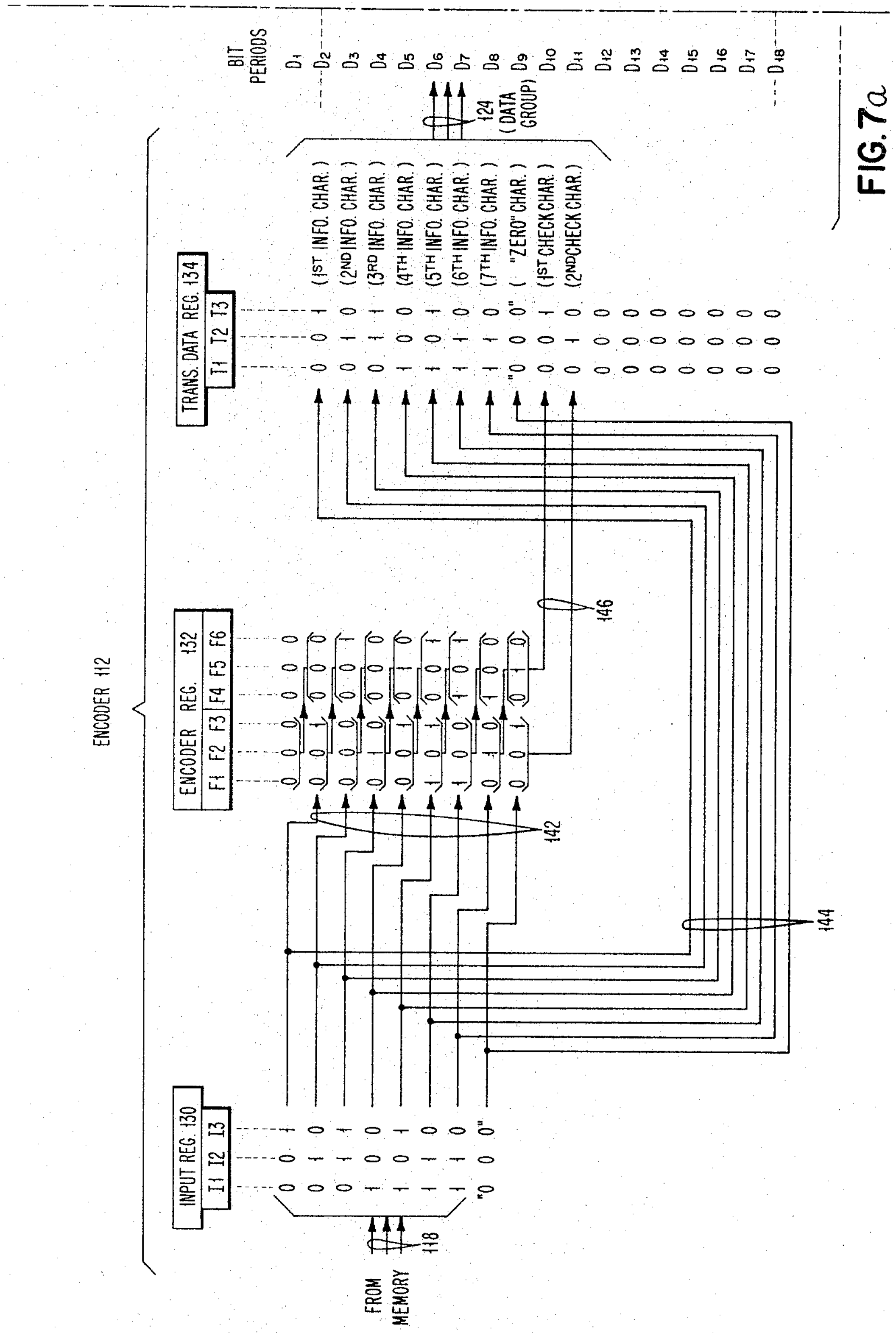
Figure 7B:
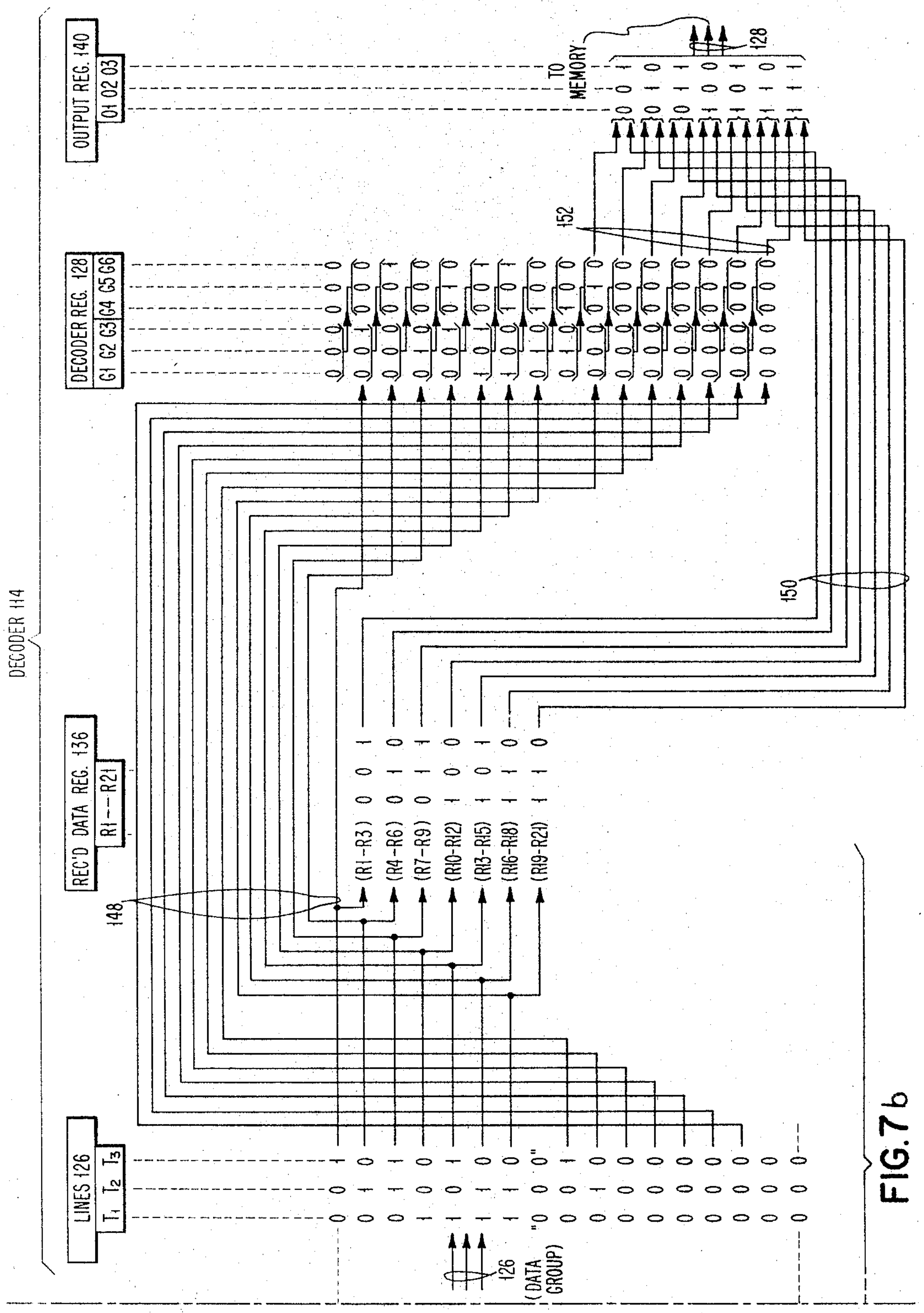
Figure 8:
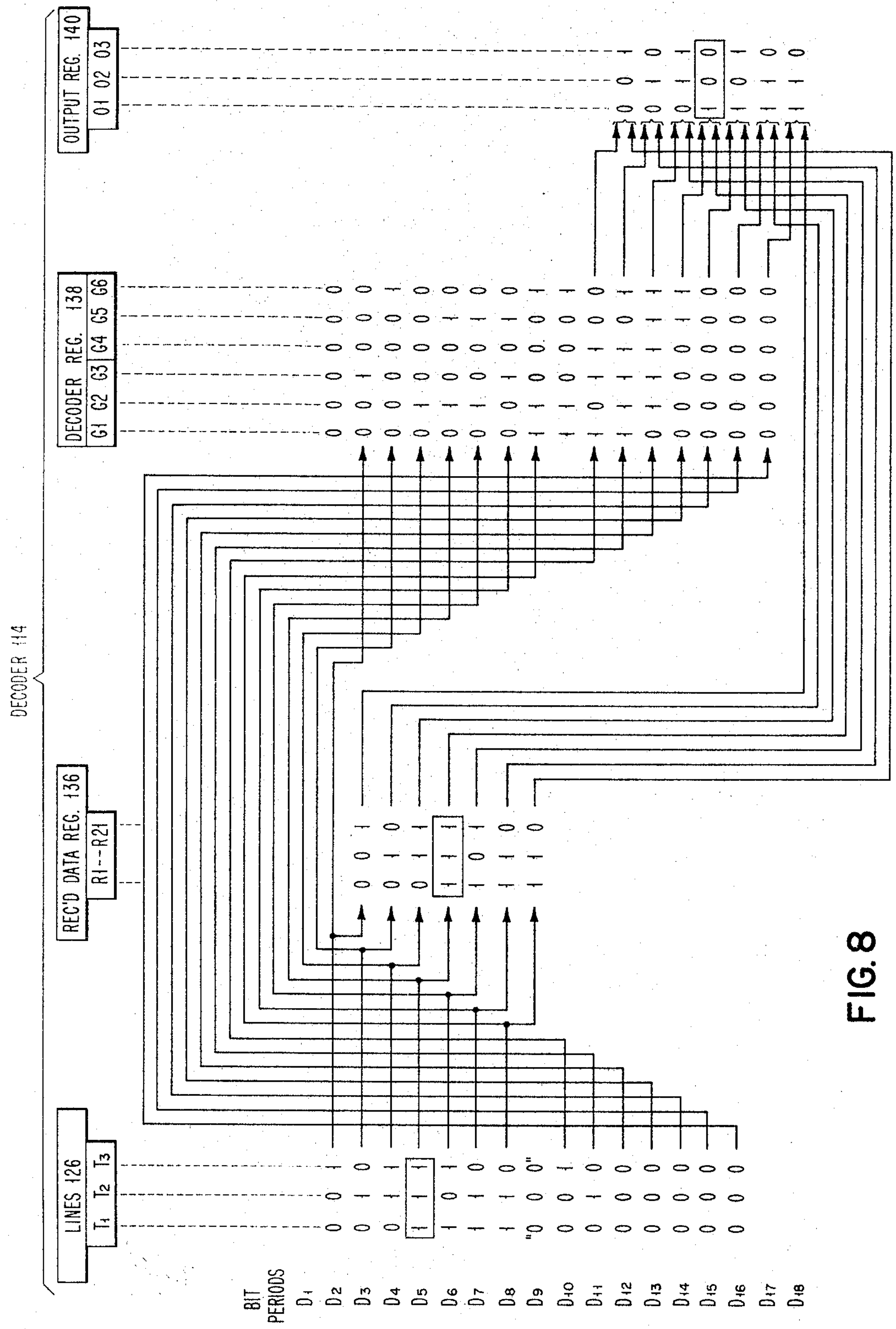

FIGURES 7*a* and 7*b* present an example of the operation of the system of the invention for which information is transmitted correctly; and FIGURE 8 presents an example of the operation of the system of the invention in which error detection, location and correction is involved.

The present invention contemplates the integration of the aforementioned error detection and correction technique into a computer system capable of storing numbers as combinations of "true" and "false" states in a set of bi-stable state circuits such as flip-flops, as a bi-state magnetic recording on a magnetizable surface, or as some other well known form of binary representation, and involves the sequential operation of computer structure including pulse sources, AND gates, OR gates, etc. Very generally, the system of the present invention may be regarded as comprised of flip-flops, a source of clock signals for synchronization, counters and associated "logical" networks capable of controlling the operation of the combination of components to be described.

The invention provides error detection, location and correction in a communications system environment, which includes a transmitting station and a receiving station, both operating in sequential steps as follows.

In the transmitting station, an input register having a plurality of stages each capable of storing a binary digit (bit), is set up to correspond, in sequence, to the information characters of a word being received from a computer memory or some other source and then is reset to store a "zero" character. An encoder register, having twice as many stages as the input register, is arranged by internal feedback connections to shift contents such that half of its stages respond to the outputs of the input register while its other half responds to the outputs of its first half. The internal feedback connections of the encoder register are made through exclusive OR gates, as will be derived, and thus, after all information characters and the "zero" character have been sensed, each of the stages of the encoder register stores a representation of the modulo 2 sum of the sequential bit values set up in a selected stage of the input register as well as selected stages of the encoder register itself; in brief, after the encoder register completes its operation on the input register outputs, its second half stores a first check character and its first half stores a second check character. A transmitted data register, having the same stage capacity as the input register, responds to the outputs of the input register, then to the outputs of the first half of the encoder register, then to the outputs of the second half of the encoder register and then is reset to zero. The outputs of the transmitted data register are conveyed by parallel lines to the transmission links which carry, in order, the information characters, the "zero" character, the first check character and the second check character (comprising a data group), to the receiving station.

In the receiving station, a received data register having a number of stages equal to the number of information bits in the word, is set up to correspond to the information characters of the data group being received. Simultaneously, a decoder register having an arrangement of internal connections identical to the encoder register of the transmitting station, responds sequentially to all of the characters on the transmission links except for the "zero" character, thereby sensing the sequential bit values set up in selected stages of the transmitted data register as well as selected stages of the decoder register itself. The information characters are shifted out of the received data register and, if the decoder register is in a reset state, they are set up in an output register; but if the decoder register is not in a reset state, its state will identify the information characters affected by error, and, when the incorrect information character is handled by the output register, it will be corrected. The output register sequentially transfers the correct information characters back to the computer memory or to readout equipment or otherwise.

Before going into a description of the details of the circuitry of the invention as applied to a specific example, the convention employed herein for nomenclature will be explained.

The circuits of the invention are used to perform logical operations (AND, OR, etc.) and are represented in the form of equations shown in Boolean notation. The terms of the equations will be mechanized in the circuits by output signals from flip-flops, which are electronic devices having two possible steady state conditions. One of these conditions is referred to as "true" and the other condition is referred to as "false"; when a flip-flop is described as being true, it will be understood to be storing a binary digit one (bit 1), and when it is described as false, it will be understood to be storing a binary digit zero (bit 0).

The flip-flops are characterized by two inputs, only one of which may be impressed with an actuating signal at a time, and two outputs having complementary signals. Input signals to the flip-flop are supplied by gating networks and output signals from the flip-flop are supplied to gating networks. It is the operation of these networks which will be described by means of the Boolean equations, each of which thus defines the triggering of a flip-flop. The terms of an equation correspond to flip-flop output signals and the equation represents the activation of gates and, consequently, the generation of flip-flop input signals during bit periods, i.e., equal time intervals established by a "clock" signal, flip-flop triggering actually occurring at the end of the bit period, so that the flip-flops are in the desired states during the next bit period.

The nomenclature used for the present invention employs combinations of letters and numbers for designating the terms of the equations. The flip-flops themselves are designated by combinations of capital letters and numbers: thus, flip-flops F1, O3, etc. One output signal of the flip-flop is characterized by a corresponding capital letter with the associated number shown as a subscript: thus, signals $F_1$, $O_3$, etc. In order to distinguish the complementary output of the flip-flop, it is accompanied by an affixed prime: thus, signals $F_1'$, $O_3'$, etc. It will be understood that the output signals comprise a pair of voltage levels, one high and one low on a line, and, when the unprimed signal output of a flip-flop is high in voltage and the primed signal output is low in voltage, the flip-flop is true, while, for the reverse condition, the flip-flop is false: thus, flip-flop F1 is true when signal $F_1$ is at the high voltage level and signal $F_1'$ is at the low voltage level.

On the other hand, the signals to the flip-flops are designated by corresponding lower case letters with the associated number shown as a subscript. The input signal for rendering the flip-flop true is designated by a subscript 1 prefixing the lower case letter: thus, signals ${}_1f_1$, ${}_1o_3$, etc. The input signal for rendering the flip-flop false is designated by a subscript 0 prefixing the lower case letter: thus, signals ${}_0f_1$, ${}_0o_3$, etc. These signals take the form of sharp pulses occurring at the trailing edge of a clock signal, i.e., at the end of a bit period, as will be defined.

Although the inventive concept is quite applicable to other systems of representing information in a computer, it will be presented herein with regard to a synchronized pulse system. By this is meant a system in which repetitive pulses, whether information representing, or clock signals, or otherwise, are synchronized to occur at particular time intervals with reference to each other. In such a system, signals may be of square wave shape alternating between the aforementioned voltage levels present on a line; and it is most convenient to regard synchronization as being provided by clock signals of symmetrical square wave shape generated by a pulse generator, which may comprise a repetitive magnetic recording associated with a sensing electromagnetic transducer and pulse shaping circuitry, or a frequency controlled square wave generator, or other appropriate means. Synchronization by such means implies that the potential of a line may change between the voltage levels only at the time of the trailing edge of the clock signal pulse, the time between trailing edges being designated as a bit period.

Figure 1:
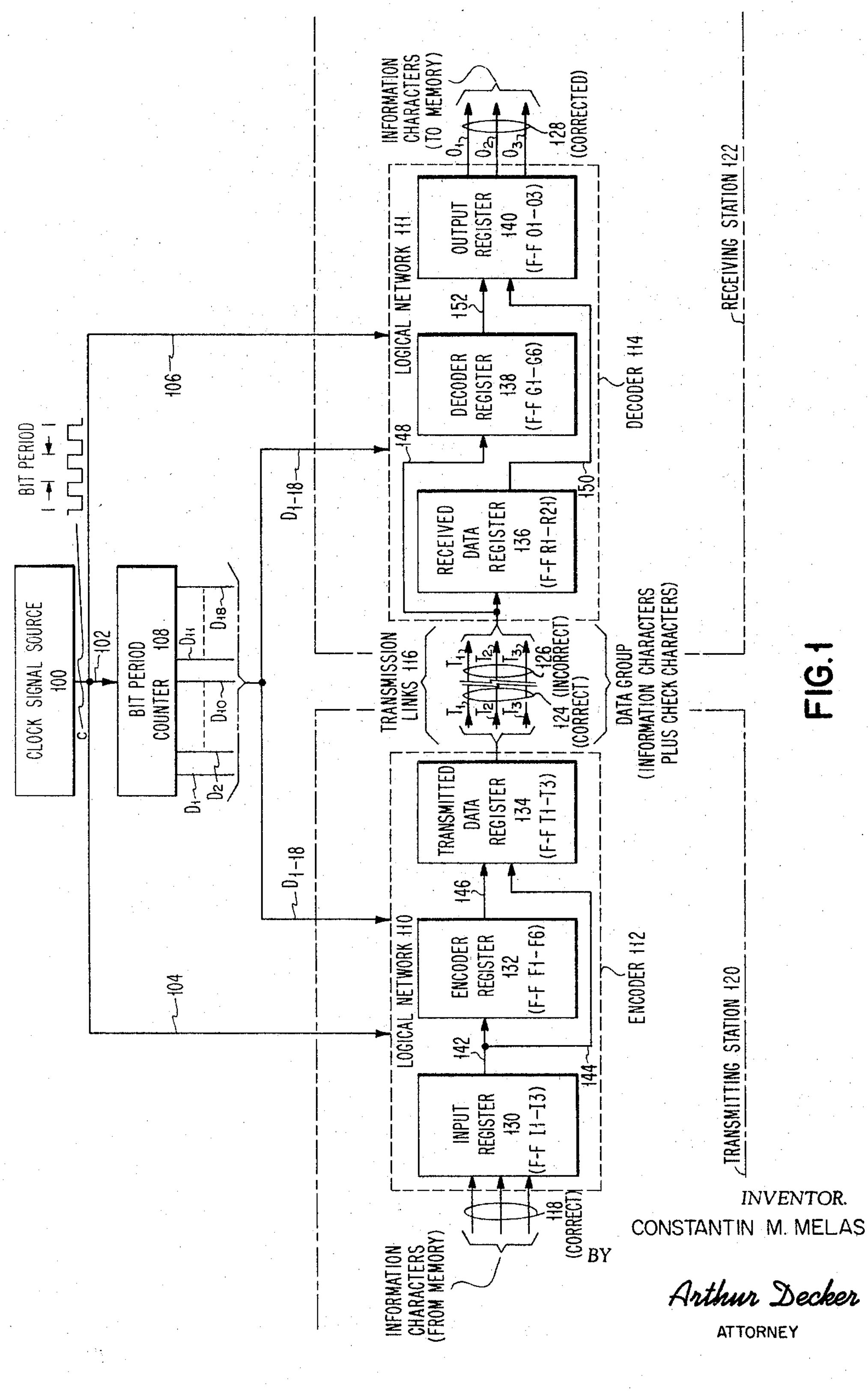
FIGURE 1 is a block diagram of an information handling system comprising a preferred embodiment of the invention.

Referring now to FIGURE 1, it is seen that the preferred illustrative information handling system comprises equipment in transmitting station 120 and receiving station 122, a clocking system being employed for synchronization. Logical networks 110 and 111, included in encoder 112 of transmitting station 120 and decoder 114 of receiving station 122, respectively, are operative to cooperate with various registers, as shown, together with equipment to provide for entering information into, removing information from, and sequencing the operation of, this combination.

The aforementioned bit periods are established by clock signal source 100 which emits symmetrical square wave signal C on lines 102, 104 and 106; these lines provide signal C input to bit period counter 108 and logical networks 110 and 111, respectively. For simplicity, synchronism between transmitting station 120 and receiving station 122 by means of a single clocking system is illustrated, although it is to be understood that asynchronous operation may be preferred, for instance, where the stations are located in separate equipments such as a computer and a magnetic tape unit, which characteristically operate at different speeds.

The function of bit period counter 108 is to count clock signals C and to generate sequential and cyclical signals $D_1$ through $D_{18}$ on output lines as required for the exemplary 7-character word and 10-character data group to be handled; only one of the output lines from counter 108 may be at the high potential at a time. Counter 108 responds to 18 sequential clock signals C and then recycles; thus by noting the output of counter 108, succeeding bit periods may be identified. Such counters are well known to be capable of providing the basic timing sequence which controls the activation of appropriate computer portions, such as logical networks 110 and 111 in the present case. Logical networks 110 and 111 include registers each of which is activated, as will be detailed, at particular bit periods in the sequence $D_1$ through $D_{18}$, in order to accomplish the information handling to be described.

Logical networks 110 and 111 also serve to route information in a manner appropriate to perform the desired error detection, location and correction, and are connected to each other by transmission links 116, which comprise a set of lines, in number equal to the number of bits per character contemplated to be handled (three in the exemplary case).

The 7 three-bit characters of a word are sequentially received by encoder 112 in transmitting station 120 one bit on each of lines 118, presumably correct as recorded in the computer memory, and are set up by logical network 110 in input register 130; input register 130 is then reset (all stages set to zero). Both encoder register 132 and transmitted data register 134 are caused by logical network 110 to respond to the sequential outputs of input register 130, the former by way of line 142, while it sequences to compute a pair of check characters and the latter, by way of line 144, to be serially set up with the information characters followed by a character comprising all zero bits. Subsequently, transmitted data register 134 responds to encoder register 132 via line 146 to receive the two check characters. The transmitted data group which appears on lines 124 of transmission links 116 thus comprises, in sequence: seven information characters, a "zero" character and two check characters.

As already pointed out, it is herein presumed that transmission links 116 are imperfect, i.e. affected by atmospheric disturbances, or some other effect which may cause the data group to be received on lines 126 of receiving station 122 characterized by errors in one or more bits of one or more characters. Logical network 111 of decoder 114 causes the information characters of the data group to be shifted into received data register 136, where it is stored pending the outcome of error checks by decoder register 138, which is responsive, via line 148, to the entire data group as well as the reset condition of transmitted data register 134. If no errors are located, the information characters are transferred via line 150, a character at a time, from received data register 136 to output register 140, and thence back to the memory via lines 128. However, if decoder register 138 indicates, via line 152, the presence of errors in the information characters, the incorrect characters are located and modified by logical network 111 as they are transferred into output register 140 so that they enter the computer memory in correct form.

Figures 2, 6:
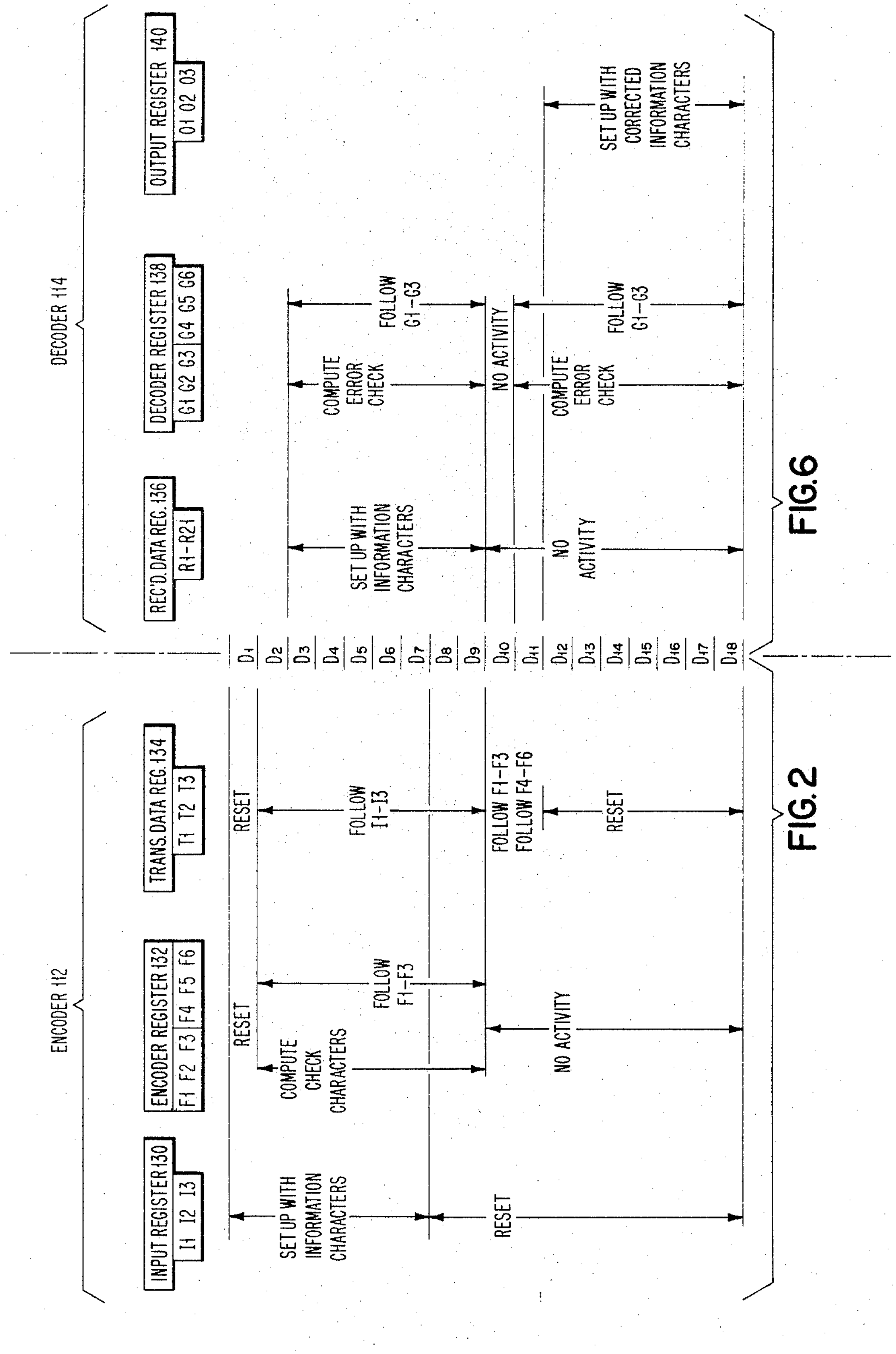
FIGURES 2 and 6 are sequential bit period diagrams, presented compositely, of operation of the encoder and decoder of the invention.

The aforementioned activity of encoder 112 is detailed in FIGURE 2 with regard to the sequential bit periods $D_{1-18}$; consequently, FIGURE 2 may be considered to comprise a presentation of the "flow diagram" of system operation for encoder 112. In the figure, the flip-flops of encoder 112 are enumerated in the columns and their activity for each bit period is summarized. As indicated, prior to period $D_1$, logical network 110 (FIGURE 1) arranges for the first incoming character to be set up in flip-flops I1 to I3 of input register 130. It is to be noted in this respect that the bit significance (the value assigned the bit position in the character) is immaterial as far as the operation of the invention is concerned, provided that the significance remains consistent throughout the handling of information by the system. Also, prior to period $D_1$, flip-flops F1 to F6 of encoder register 132 and flip-flops T1 to T3 of transmitted data register 134 are set false in preparation for activity during subsequent bit periods. Techniques for these operations are well known and are not considered as inherent in the system of the invention; therefore, logical equations and networks corresponding thereto will not be shown or described here. Thus, at the fall of the clock signal terminating period $D_1$, flip-flops I1 to I3 are storing the first character of the incoming word and flip-flops F1 to F6 and T1 to T3 are storing binary zeros. Flip-flops I1 to I3 continue to receive information characters through period $D_7$, when they are reset. The trailing edges of the clock signal energize portions of logical network 110 which set up flip-flops F1 to F3 to sequence and compute check characters related to the characters as stored in flip-flops I1 to I3 during periods $D_{1-8}$; these comprise the 7 information characters during period $D_{1-7}$ and a "zero" character during period $D_8$. As the bits of the check characters are computed, they are shifted into flip-flops F4 to F6, which "follow" flip-flops F1 to F3, respectively (i.e., the contents of the latter are shifted into the former). Simultaneously, flip-flops T1 to T3 of transmitted data register 134 also respond to the content of flip-flops I1 to I3 and thus emit the 7 information characters of the word and the "zero" character on lines 124 (FIGURE 1). At the end of period $D_9$, all 7 information characters and the "zero" character have been emitted. During period $D_8$ the second check character is in flip-flops F1 to F3 and, at the end of this period, is shifted into flip-flops F4 to F6, which then cease activity. During period $D_9$ the first check character is in flip-flops F1 to F3, which then also cease activity. Thus, during period $D_9$, the complete parity check is set up in flip-flops F1 to F6. At the end of periods $D_9$ and $D_{10}$, flip-flops T1 to T3 receive the contents of flip-flops F1 to F3 and F4 to F6, respectively and, at the end of period $D_{11}$, are reset. In summary, the transmitted data group comprises the seven information characters, followed by an all-zero character which is, in turn, followed by the two check characters and a sequence of all-zero characters; these appear on lines 124, which are the outputs of flip-flops T1 to T3 and are correspondingly labelled in FIGURE 1.

The method by which encoder 112 generates the two check characters will be explained by reference to FIGURES 3, 4 and 5, comprising, respectively, truth tables depicting the triggering requirements for flip-flops F1 to F3 and in accordance with which logical network 110 operates. Logical network 110 is energized to provide this logic during periods $D_{1-8}$, as indicated, as defined by the characteristic equations shown for each of the flip-flops F1 to F3. Thus, the characteristic equation $$F1=I1\oplus F2\oplus F4$$

signifies that the state of flip-flop F1 during a bit period will be defined by exclusive OR connections of the outputs of flip-flops I1, F2 and F4 during the next prior bit period; i.e., that flip-flop F1 will trigger true if the modulo 2 sum of the states of flip-flops I1, F2 and F4 is 1 but will trigger false if the modulo 2 sum of the states of these flip-flops is 0. The truth table tabulation of all combinations of states of flip-flops I1, F2 and F4 specifies those combinations resulting in true and false states in flip-flop F1. The above characteristic equation is to be distinguished from the trigger equations for flip-flop F1 which are given below the truth table and specify the trigger conditions required to set flip-flop F1 true (the ${}_1f_1$ equation) and the triggering conditions require to set flip-flop F1 false (the ${}_0f_1$ equation). The first term of the ${}_1f_1$ equation, for instance, specifies that flip-flop F1 will be set true at the fall of a clock signal terminating any of the bit periods $D_{1-8}$ if outputs $I_1$ (of flip-flop I1), $F_2$ (of flip-flop F2) and $F_4$ (of flip-flop F4) are simultaneously at the high voltage level, or if outputs $I_1$, $F_2'$ and $F_4'$ are simultaneously at the high voltage level. When the rest of the ${}_1f_1$ equation and the ${}_0f_1$ equation are similarly regarded, it will be seen that these equations state the flip-flop F1 characteristic equation in the form of inclusive OR and AND gates, in which form they may readily be mechanized by well known computer hardware, such as diode-resistor circuitry, saturable magnetic cores, etc. The triggering equations shown for flip-flops F2 and F3 are similarly related to their respective characteristic equations and are similarly derived.

The system of the present invention provides a code for single character correction regardless of the number of bits of which the character is composed, as follows. The $2^n$ possible states for an $n$-bit binary character may be designated by the symbols 0, $a^0$, $a^1$, $a^2$, $a^3$ . . . $a^{2n-2}$, and, if they are to be distinct, they must be related by a primitive polynomial which here will be designated the field polynomial. Thus, for example, there are 8 possible states for a 3-bit character, designated 0, 1, $a$, $a^2$, $a^3$, $a^4$, $a^5$, $a^6$ and the field polynomial is $a^3=a+1$. From the field polynomial may be derived the exclusive OR gate connections of the flip-flops of the encoder and decoder of an error checking system; this is accomplished by considering the basic matrix $$\begin{vmatrix} a1 \\ 10 \end{vmatrix}$$

employed for all codes and deriving from it an expanded matrix comprising an "a" matrix, the two "unit" matrices and a "null" matrix. The "a" matrix is formed from the "unit" matrix by removing the first row and adding a last row constructed from the field polynomial by taking a "zero" to correspond to each non-represented symbol and a "one" to correspond to each represented symbol in the field polynomial; thus, for a 3-bit character:

| Field Polynomial | Expanded Matrix | | | | | | |
|---|---|---|---|---|---|---|---|
| | | Encoder-Decoder Flip-Flop Outputs | | | | | |
| $a^3=0\times a^2+1\times a+1\times 1$ | Encoder-Decoder Flip-Flop Inputs: | F1 | F2 | F3 | F4 | F5 | F6 |
| | F1 | 0 | 1 | 0 | 1 | 0 | 0 |
| | F2 | 0 | 0 | 1 | 0 | 1 | 0 |
| | F3 | 1 | 1 | 0 | 0 | 0 | 1 |
| | F4 | 1 | 0 | 0 | 0 | 0 | 0 |
| | F5 | 0 | 1 | 0 | 0 | 0 | 0 |
| | F6 | 0 | 0 | 1 | 0 | 0 | 0 |

The encoder-decoder of the error checking system may be constructed by considering the "ones" in a row as the outputs which, together with the bits for one order of the characters of the input data, energize the exclusive OR gate at the input to each flip-flop corresponding to the top 3 rows. Thus, $$F1=F2\oplus F4\oplus I1$$
$$F2=F3\oplus F5\oplus I2$$
$$F3=F1\oplus F2\oplus F6+I3$$

The remaining flip-flops are gated without any direct connection to the input data:

$$F4=F1$$
$$F5=F2$$
$$F6=F3$$

In the encoder operation, for example, the 3 parallel bits of a character are gated to flip-flops F1, F2 and F3 and clocked; after the 8 or less characters of a word have been encoded, two check characters will appear in flip-flops F1, F2, F3 and F4, F5, F6: The check characters are transmitted following the data characters.

Returning now to FIGURE 2, it is seen that no activity is indicated for flip-flops F1 to F3 during period $D_{10}$ subsequently and thus no triggering equation is required; for these periods, these flip-flops retain their states as set at the end of period $D_9$ (the first check character).

Flip-flops F4 to F6, during periods $D_{1-9}$, follow flip-flops F1 to F3, in accordance with the following equations:

$${}_1f_4=F_1D_{1-8} \quad {}_1f_5=F_2D_{1-8} \quad {}_1f_6=F_3D_{1-8}$$
$${}_0f_4=F_1'D_{1-8} \quad {}_0f_5=F_2'D_{1-8} \quad {}_0f_6=F_3'D_{1-8}$$

As with flip-flops F1 to F3, during period $D_{10}$ and subsequently, flip-flops F4 to F6 retain the content set up at the end of period $D_9$ (the second check character).

During periods $D_{2-9}$, flip-flops T1 to T3 follow flip-flops I1 to I3. Since the latter receive the information characters from the memory during periods prior to period $D_8$, after which they are set false, lines 124 are also sequentially set up with the information characters throughout periods $D_{2-8}$ and are set up with the "zero" character during period $D_9$:

$$ {}_1t_1=I_1D_{1-8} \quad {}_1t_2=I_2D_{1-8} \quad {}_1t_3=I_3D_{1-8} $$
$$ {}_0t_1=I_1'D_{1-8} \quad {}_0t_2=I_2'D_{1-8} \quad {}_0t_3=I_3'D_{1-8} $$

At the end of period $D_9$, flip-flops T1 to T3 are triggered to follow flip-flops F1 to F3:

$$ {}_1t_1=F_1D_9 \quad {}_1t_2=F_2D_9 \quad {}_1t_3=F_3D_9 $$
$$ {}_0t_1=F_1'D_9 \quad {}_0t_2=F_2'D_9 \quad {}_0t_3=F_3'D_9 $$

and thus the first check character appears on lines 124 during period $D_{10}$; at the end of period $D_{10}$, flip-flops T1 to T3 are triggered to follow flip-flops F4 to F6:

$$ {}_1t_1=F_4D_{10} \quad {}_1t_2=F_5D_{10} \quad {}_1t_3=F_6D_{10} $$
$$ {}_0t_1=F_4'D_{10} \quad {}_0t_2=F_5'D_{10} \quad {}_0t_3=F_6'D_{10} $$

and thus the second check character appears on lines 124 during period $D_{11}$. Flip-flops T1 to T3 are then reset at the end of period $D_{11}$:

$$ {}_0t_1=D_{11} \qquad {}_0t_2=D_{11} \qquad {}_0t_3=D_{11} $$

The composite trigger equations for flip-flops T1 to T3 are the inclusive OR sums:

$$ {}_1t_1=I_1D_{1-8}+F_1D_9+F_4D_{10} $$
$$ {}_0t_1=I_1'D_{1-8}+F_1'D_9+F_4'D_{10}+D_{11} $$
$$ {}_1t_2=I_2D_{1-8}+F_2D_9+F_5D_{10} $$
$$ {}_0t_2=I_2'D_{1-8}+F_2'D_9+F_5'D_{10}+D_{11} $$
$$ {}_1t_3=I_3D_{1-8}+F_3D_9+F_6D_{10} $$
$$ {}_0t_3=I_3'D_{1-8}+F_3'D_9+F_6'D_{10}+D_{11} $$

FIGURE 6 comprises a flow diagram depicting the operation of decoder 114 of receiving station 122 during the bit periods $D_{3-18}$, presuming no transmission delay in transmission links 116. As indicated, at the ends of periods $D_{2-8}$, flip-flops R1 to R21 respond in groups of three to the information characters of the incoming data group such that, during and subsequent to period $D_3$, the first information character is set up in flip-flops R1 to R3, the second information character is set up in flip-flops R4 to R6 . . . and the seventh information character is set up in flip-flops R19 to R21; since the response of flip-flops R1 to R21 to the signals on lines 126 ceases at period $D_8$, the "zero" character, generated by encoder 112 at the fall of the clock signal for period $D_7$, is not set up in received data register 136. As aforementioned in connection with FIGURE 2, it is again pointed out that consistency of bit significance between encoder 112 and decoder 114 is desirable. Also, prior to period $D_3$, flip-flops G1 to G6 of decoder register 138 are set false in preparation for subsequent activity; as in the case of encoder 112, this operation will not be discussed. At the fall of the clock signal terminating period $D_2$, logical network 111 causes flip-flops G1 to G3 to commence their error check generating sequence by responding to the information characters of the incoming data group (as well as to flip-flops G4 to G6, as will be shown); this activity continues until the end of period $D_9$. Since the "zero" character is received on lines 126 during period $D_9$ and should be excluded from the parity check computation, sequencing of flip-flops G1 to G3 is suspended for period $D_9$, but continues, in response to the signals on lines 126, for period $D_{10-12}$ in order to include the two encoder check characters. Thus, during period $D_{11}$, the first decoder check character is set up in flip-flops G1 to G3. Flip-flops G4 to G6 are arranged to follow flip-flops G1 to G3 during period $D_{3-9}$ and subsequent to period $D_{10}$; thus, the first decoder check character appears in flip-flops G4 to G6 during period $D_{12}$. At the end of period $D_{11}$, the second decoder check character appears in flip-flops G1 to G3. In summary, during period D12, the 7 information characters are in flip-flops R1 to R21, the first decoder check character is in flip-flops G4 to G6 and the second decoder check character is in flip-flops G1 to G3. Since a partial error check is available during period $D_{11}$, during period $D_{12-18}$ flip-flops O1 to O3 of output register 140 are set up with the corrected information characters as computed by and, if necessary, corrected by logical network 111; signals representing these characters are transmitted back to the memory or elsewhere on lines 128, which are the output lines for these flip-flops and are correspondingly labelled in FIGURE 1.

The method by which decoder 114 utilizes the received data group to identify, locate and correct errors may be understood when it is noted that the sequencing of flip-flops G1 to G3 of decoder register 138 may be represented by the same truth tables as presented in FIGURES 3, 4 and 5 except, of course, that the column designations must be changed to conform to the equipment provided in decoder 114. The corresponding characteristic equations, for periods $D_{2-8}$ and $D_{10-17}$ are:

$$ G1=T1\oplus G2\oplus G4 $$
$$ G2=T2\oplus G3\oplus G5 $$
$$ G3=T3\oplus G1\oplus G2\oplus G6 $$

and the characteristic equations for flip-flops G4 to G6, which follow flip-flops G1 to G3 throughout, are:

$$ G4=G1 $$
$$ G5=G2 $$
$$ G6=G3 $$

from which the following triggering equations may be derived:

$$ {}_1g_1=[T_1(G_2G_4+G_2'G_4')+T_1'(G_2G_4'+G_2'G_4)](D_{2-8}+D_{10-17}) $$
$$ {}_0g_1=[T_1(G_2G_4'+G_2'G_4)+T_1'(G_2G_4+G_2'G_4')](D_{2-8}+D_{10-17}) $$
$$ {}_1g_2=[T_2(G_3G_5+G_3'G_5')+T_2'(G_3G_5'+G_3'G_5)](D_{2-8}+D_{10-17}) $$
$$ {}_0g_2=[T_2(G_3G_5'+G_3'G_5)+T_2'(G_3G_5+G_3'G_5')](D_{2-8}+D_{10-17}) $$
$$ {}_1g_3=\{T_3[G_1(G_2G_6'+G_2'G_6)+G_1'(G_2G_6+G_2'G_6')]+T_3'[G_1(G_2G_6+G_2'G_6')+G_1'(G_2G_6'+G_2'G_6)]\}(D_{2-8}+D_{10-17}) $$
$$ {}_0g_3=\{T_3[G_1(G_2G_6+G_2'G_6')+G_1'(G_2G_6'+G_2'G_6)]+T_3'[G_1(G_2G_6'+G_2'G_6)+G_1'(G_2G_6+G_2'G_6')]\}(D_{2-8}+D_{10-17}) $$
$$ {}_1g_4=G_1 \quad {}_1g_5=G_2 \quad {}_1g_6=G_3 $$
$$ {}_0g_4=G_1' \quad {}_0g_5=G_2' \quad {}_0g_6=G_3' $$

The logic for flip-flops O1 to O3 for period $D_{11-17}$ evolves from a consideration of the fact that these flip-flops are sequentially set up with information characters by logical network 111 which are the results of modulo 2 additions of corresponding bits of the information characters stored in received data register 136 and decoder check characters generated by decoder register 138, in accordance with the following characteristic equations:

$$ O1=R1\oplus\overline{G1G2G3}G4 $$
$$ O2=R2\oplus\overline{G1G2G3}G5 $$
$$ O3=R3\oplus\overline{G1G2G3}G6 $$

and the corresponding triggering equations are:

$$ {}_1o_1=(R_1G_a'+R_1'G_a)D_{11}+(R_4G_a'+R_4'G_a)D_{12}\ .\ .\ .\ +(R_{19}G_a'+R_{19}'G_a)D_{17} $$
$$ {}_0o_1=(R_1G_a+R_1'G_a')D_{11}+(R_4G_a+R_4'G_a')D_{12}\ .\ .\ .\ +(R_{19}G_a+R_{19}'G_a')D_{17} $$
$$ {}_1o_2=(R_2G_b'+R_2'G_b)D_{11}+(R_5G_b'+R_5'G_b)D_{12}\ .\ .\ .\ +(R_{20}'G_b'+R_{20}'G_b)D_{17} $$

$${}_0o_2=(R_2G_b+R_2'G_b')D_{11}+(R_5G_b+R_5'G_b')D_{12}\ .\ .\ .\ +(R_{20}G_b+R_{20}'G_b')D_{17}$$

$${}_1o_3=(R_3G_c'+R_3'G_c)D_{11}+(R_6G_c'+R_6'G_c)D_{12}\ .\ .\ .\ +(R_{21}G_c'+R_{21}'G_c)D_{17}$$

$${}_0o_3=(R_3G_c+R_3'G_c')D_{11}+(R_6G_c+R_6'G_c')D_{12}\ .\ .\ .\ +(R_{21}G_c+R_{21}'G_c')D_{17}$$

in which the following simplified notation is employed:

$$G_a=G_1'G_2'G_3'G_4$$
$$G_a'=(G_1'G_2'G_3'G_4)'=G_1+G_2+G_3+G_4'$$
$$G_b=G_1'G_2'G_3'G_5$$
$$G_b'=(G_1'G_2'G_3'G_5)'=G_1+G_2+G_3+G_5'$$
$$G_c=G_1'G_2'G_3'G_6$$
$$G_c'=(G_1'G_2'G_3'G_6)'=G_1+G_2+G_3+G_6'$$

It is to be noted that, since the derivation of the two check characters by encoder 112 and the generation of the error check sequence by decoder 114 provide for each character of the information group separately, the system of the invention is capable of detecting, locating and correcting errors in any combination in any number of information characters, as will become evident upon consideration of examples of the operation of the invention.

FIGURES 7*a* and 7*b* involve the transmission and reception of a word of seven information characters without error having occurred in the process. The information characters 001, 010, 011, 100, 101, 110 and 110, appear sequentially during period $D_{1-7}$ in flip-flops I1 to I3, followed by the character 000 during period $D_8$ in accordance with the activity defined by the column headed "input register 130" in the flow diagram, FIGURE 2. During period $D_{2-9}$, these characters appear in flip-flops T1 to T3 of transmitted data register 134 and thus in transmission links 116. During period $D_{3-9}$, received data register 136 responds to the information characters only (the "zero" character, which was not part of the information word as recorded in the memory, is lost). In encoder register 132, flip-flops F1 to F3, during period $D_{2-9}$, respond to the content in flip-flops I1 to I3 and sequence to compute the second check character 010, which is set-up in flip-flops F1 to F3 during period $D_8$, and to compute the first check character 001, which is set-up in flip-flops F1 to F3 during period $D_9$. Since flip-flops F4 to F6 have been receiving the contents of flip-flops F1 to F3 throughout, during period $D_9$, the second check character 010 appears in flip-flops F3 to F6. During period $D_{10-11}$, flip-flops T1 to T3 of transmitted data register 112 receive the first check character 001 from flip-flops F1 to F3 and then the second check character 010 from flip-flops F4 to F6. During period $D_{3-9}$, flip-flops G1 to G3 of decoder register 138 have been sequencing similarly to flip-flops F1 to F3, utilizing the information characters set up in flip-flops T1 to T3; during period $D_{10}$, they are inactive in order to prevent the zero character from affecting their sequence, and again sequence during period $D_{11-12}$ in order to include the check characters 001 and 010. When these are included, and since there have been no errors in the handling of the information characters, flip-flops G1 to G3 store 000 during period $D_{11}$ and subsequently. Flip-flops G4 to G6 have been following flip-flops G1 to G3 (except for inactivity during period $D_{10}$) and then store 000 during period $D_{12}$ and subsequently. Starting during period $D_{13}$, flip-flops O1 to O3 of output register 140 sequentially respond to the flip-flops of the received data register 136 and decoder register 138 to generate seven corrected information characters, which are of the same values as set up in received data register 136 since the flip-flops in decoder register 138 are all false. Thus, the same values of the seven information characters received by the system from the memory are returned to the memory.

FIGURE 8 indicates operation involving the correction of an error in the fourth information character of the foregoing example. The activity of encoder 112 is the same as previously shown in connection with FIGURE 7 and thus is not repeated. The fourth information character, which should be 100, has been affected by a disturbance, presumably while in transmission links 116, and is received on lines 126 as 111, in which form it is stored during period $D_6$ in flip-flops R10 to R12 of received data register 136. Because of this error, it is seen that, commencing during period $D_6$, the states of flip-flops G1 to G6 of decoder register 138 do not correspond to their states as shown in FIGURES 7*a* and 7*b*, and, during period $D_{11}$ (after all information characters and the second check character have been used in their sequence computation), these flip-flops are storing 101100 and, during period $D_{12}$ (after the entire data group has been used in their sequence computation), these flip-flops are storing 111101. Referring to the triggering equations previously given for output register 140, the following partial triggering equations are effective at the end of period $D_{11}$:

$${}_1o_1=R_1G_a'+R_1'G_a \qquad {}_0o_1=R_1G_a'+R_1'G_a'$$
$${}_1o_2=R_2G_b'+R_2'G_b \qquad {}_0o_2=R_2G_b+R_2'G_b'$$
$${}_1o_3=R_3G_c'+R_3'G_c \qquad {}_0o_3=R_3G_c+R_3'G_c'$$

Of the above terms, only the $R_1'G_a'$, $R_2'G_b'$, and $R_3G_c'$ terms of the ${}_0o_1$, ${}_0o_2$ and ${}_1o_3$ equations, respectively, are effective to trigger their flip-flops; thus the state of output register 140 during period $D_{12}$ will be 001, which corresponds to the first information character. Correspondence for the second and third information characters may be similarly shown. For the fourth information character, FIGURE 8 shows that flip-flops G1 to G6 have proceeded in their sequence such that their states are 000011 during period $D_{14}$. The partial triggering equations for flip-flops O1 to O3 effective at the end of period $D_{14}$ are:

$${}_1o_1=R_{10}G_a'+R_{10}'G_a \qquad {}_0o_1=R_{10}G_a+R_{10}'G_a'$$
$${}_1o_2=R_{11}G_b'+R_{11}'G_b \qquad {}_0o_2=R_{11}G_b+R_{11}'G_b'$$
$${}_1o_3=R_{12}G_c'+R_{12}'G_c \qquad {}_0o_3=R_{12}G_c+R_{12}'G_c'$$

Of the above terms, only the $R_{10}G_a'$, $R_{11}G_b$ and $R_{12}G_c$ terms of the ${}_1o_1$, ${}_0o_2$ and ${}_0o_3$ equations, respectively, are effective to trigger their flip-flops; thus the state of output register 140 during period $D_{15}$ will be 100, which corresponds to the fourth correct information character. For the fifth and subsequent information characters, flip-flops G1 to G6 have proceeded in their sequence such that all their states are false; therefore the subsequent information characters will be transmitted by output register 140 just as set up in received data register 136.

It should be obvious that, where parallel transmission of numbers having a greater number of digits is to be handled, additional storage in the registers must be provided to preserve the system of the invention. Although the registers have been shown herein in flip-flop form, the recirculating line types presently well known could also be used within the concept of the invention, and these may easily be made to operate sequentially by the logic in the system. Either method of storage could be extended for any number of digits in a binary number to be handled. It should also be obvious that additional bit periods of computer operation may be devoted to the error detection, location and correction system herein described where larger numbers are to be handled.

It may also be noted that the present system is easily adaptable to handling a number of characters less than the maximum permitted by the bit-count of the character (e.g., in the illustartive showing, a transmission of, for instance only 5 characters whereas 7 are permitted by the 3-bit character content) by "fiilling out" the maximum with all zero characters or by reducing the number of bit periods in the system. It should further be apparent that, by making available a mid-bit period shift pulse effective to sequence encoder register 132 and decoder register 138, fewer bit periods of operation would be involved and the handling of a "zero" character following the information characters would be obviated.

While the invention has been particularly shown and described with reference to a preferred embodiment thereof, it will be understood by those skilled in the art that various changes in form and details may be made therein without departing from the spirit and scope of the invention.

What is claimed is:

1. In an error checking system for digital data consisting of a group of sequential characters, each comprising a set of bits simultaneously generated and positionally unique;

a first register having a stage corresponding to each bit position in the characters and capable of being set up with signals representing the characters;

a first sequencing register having a first set of stages each responsive to the signals in a stage of said first register, a second set of stages each responsive to the signals in a stage of the first set and feedback connections between the sets of stages as well as between the stages of the first set, and capable of generating in each of the sets of stages signals corresponding to a check character in accordance with the signals in said first register as well as the feedback connections;

a second register having a stage corresponding to each bit position in the characters and responsive to the signals set up in said first register, then to the check character signals generated in the first set of stages of said first sequencing register and then to the check character signals generated in the second set of stages of said first sequencing register;

a set of channels for simultaneous communication, a channel corresponding to each bit position in the characters and responsive to the signals set up in said second register;

a third register having a plurality of stages corresponding to each bit position in the characters and capable of being set up with signals representing all the characters of the group;

a second sequencing register having a first set of stages each responsive to the signals in a channel of said set of channels, a second set of stages each responsive to the signals in a stage of the first set and feedback connections between the sets of stages as well as between the stages of said first set, and capable of generating in each of the sets of stages signals corresponding to a check character in accordance with the signals in said set of channels as well as the feedback connections; and a fourth register having a plurality of stages corresponding to each position in the characters and responsive to the signals in said third register simultaneously with the check character signals in said second sequencing register.

2. The system of claim 1 wherein the feedback connections of said first and second sequencing registers are identical.

3. The system of claim 2 wherein the feedback connections of said first and second sequencing registers are through exclusive OR circuits.

References Cited by the Examiner

UNITED STATES PATENTS

| | | | |
|---|---|---|---|
| 2,954,432 | 9/1960 | Lewis | 340—146.1 |
| 3,051,784 | 8/1962 | Neumann | 340—146.1 |
| 3,128,449 | 4/1964 | Armstrong | 340—146.1 |
| 3,131,377 | 4/1964 | Grondin | 340—146.1 X |
| 3,155,818 | 11/1964 | Goetz | 340—146.1 |
| 3,155,819 | 11/1964 | Goetz | 340—146.1 |
| 3,162,837 | 12/1964 | Meggitt | 340—146.1 |
| 3,199,076 | 8/1965 | Rea et al. | 340—146.1 |

MALCOLM A. MORRISON, *Primary Examiner.*

ROBERT C. BAILEY, M. P. ALLEN, M. J. SPIVAK, *Assistant Examiners.*